United States Patent
Chabane et al.

(10) Patent No.: US 10,502,058 B2
(45) Date of Patent: Dec. 10, 2019

(54) COUPON FOR HOT GAS PATH COMPONENT HAVING MANUFACTURING ASSIST FEATURES

(71) Applicant: General Electric Company, Schenectady, NY (US)

(72) Inventors: Hinde Chabane, Lenzburg (CH); Matthias Hoebel, Windisch (CH)

(73) Assignee: General Electric Company, Schenectady, NY (US)

( * ) Notice: Subject to any disclaimer, the term of this patent is extended or adjusted under 35 U.S.C. 154(b) by 440 days.

(21) Appl. No.: 15/205,177

(22) Filed: Jul. 8, 2016

(65) Prior Publication Data
US 2018/0010458 A1   Jan. 11, 2018

(51) Int. Cl.
 *F01D 5/00* (2006.01)
 *F01D 5/18* (2006.01)
 (Continued)

(52) U.S. Cl.
 CPC .............. *F01D 5/005* (2013.01); *B33Y 50/02* (2014.12); *B33Y 80/00* (2014.12); *F01D 5/14* (2013.01); *F01D 5/147* (2013.01); *F01D 5/18* (2013.01); *F01D 5/181* (2013.01); *F01D 9/02* (2013.01); *F01D 9/041* (2013.01); *F01D 25/12* (2013.01); *F05D 2220/32* (2013.01); *F05D 2230/10* (2013.01); *F05D 2230/30* (2013.01); *F05D 2230/31* (2013.01); *F05D 2230/72* (2013.01);
 (Continued)

(58) Field of Classification Search
 CPC ...... F01D 5/00; F01D 5/18; F01D 9/02; F01D 25/12
 See application file for complete search history.

(56) References Cited

U.S. PATENT DOCUMENTS

| | | | |
|---|---|---|---|
| 5,269,057 A | 12/1993 | Mendham | |
| 6,238,187 B1 * | 5/2001 | Dulaney | ................. B23P 6/005 416/223 R |

(Continued)

FOREIGN PATENT DOCUMENTS

| | | |
|---|---|---|
| DE | 10 2014 226 055 A1 | 6/2016 |
| EP | 1074331 | 2/2001 |

(Continued)

OTHER PUBLICATIONS

K.J. Pallos, GE Energy Services Technology, "Gas Turbine Repair Technology" GER-3957B, (Apr. 2001) 30 pages.

(Continued)

*Primary Examiner* — Scott R. Walshon
*Assistant Examiner* — Sathavaaram I Reddy
(74) *Attorney, Agent, or Firm* — Dale Davis; Hoffman Warnick LLC

(57) ABSTRACT

A coupon for replacing a cutout in a hot gas path component of a turbomachine is provided. In one embodiment, the coupon includes a body having an outer surface; and a plurality of grinding depth indicators in the outer surface of the body. In another embodiment, the coupon includes a body having an edge periphery configured to mate with an edge periphery of the cutout, and at least a portion of the edge periphery of the body has a wall thickness greater than a wall thickness of an edge periphery of the cutout. The embodiments may be used together or separately.

13 Claims, 16 Drawing Sheets

(51) Int. Cl.
  *F01D 9/02* (2006.01)
  *F01D 25/12* (2006.01)
  *B33Y 50/02* (2015.01)
  *B33Y 80/00* (2015.01)
  *F01D 5/14* (2006.01)
  *F01D 9/04* (2006.01)

(52) U.S. Cl.
  CPC ......... *F05D 2230/80* (2013.01); *Y02T 50/676* (2013.01)

(56) References Cited

U.S. PATENT DOCUMENTS

| | | | |
|---|---|---|---|
| 6,508,000 | B2 | 1/2003 | Burke et al. |
| 7,377,746 | B2 | 5/2008 | Brassfield et al. |
| 8,414,263 | B1 | 4/2013 | Liang |
| 8,500,411 | B2 * | 8/2013 | Marra .................. B22C 9/04 164/516 |
| 8,506,836 | B2 * | 8/2013 | Szuromi ............... B22F 3/1055 216/102 |
| 8,910,361 | B2 | 12/2014 | Rickenbacher et al. |
| 8,978,249 | B2 | 3/2015 | Hovel et al. |
| 2003/0082048 | A1 * | 5/2003 | Jackson ................. B23P 6/005 415/115 |
| 2005/0235492 | A1 | 10/2005 | Arness et al. |
| 2015/0047168 | A1 | 2/2015 | James et al. |
| 2015/0086376 | A1 | 3/2015 | Fandrei, II |
| 2015/0086408 | A1 | 3/2015 | Kottilingam et al. |
| 2015/0147164 | A1 | 5/2015 | Cui et al. |
| 2015/0184520 | A1 | 7/2015 | Potter et al. |
| 2015/0184537 | A1 | 7/2015 | Smith |
| 2016/0069185 | A1 | 3/2016 | Stankowski et al. |
| 2016/0177733 | A1 | 6/2016 | Lewis et al. |
| 2018/0010457 | A1 | 1/2018 | Chabane et al. |

FOREIGN PATENT DOCUMENTS

| | | |
|---|---|---|
| EP | 1231010 A1 | 8/2002 |
| EP | 2361720 | 8/2011 |
| EP | 2 783 792 A1 | 10/2014 |
| EP | 2783792 A1 | 10/2014 |
| EP | 2876257 A1 | 5/2015 |
| WO | 2013/066680 A1 | 5/2013 |
| WO | 2013120999 | 8/2013 |
| WO | 2015191041 | 12/2015 |
| WO | 2016/096382 A1 | 6/2016 |

OTHER PUBLICATIONS

Partial European Search Report and Opinion issued in connection with corresponding EP Application No. 17180197.0 dated Jan. 29, 2018.

Extended European Search Report and Opinion issued in connection with corresponding EP Application No. 17180197.0 dated May 22, 2018.

U.S. Appl. No. 15/205,167, Non-Final Office Action dated Apr. 17, 2019, (GEEN-0833-US1), 20 pages.

International Search Report issued in connection with corresponding EP application No. 191150696.3 dated Jun. 13, 2019, 7 pages.

* cited by examiner

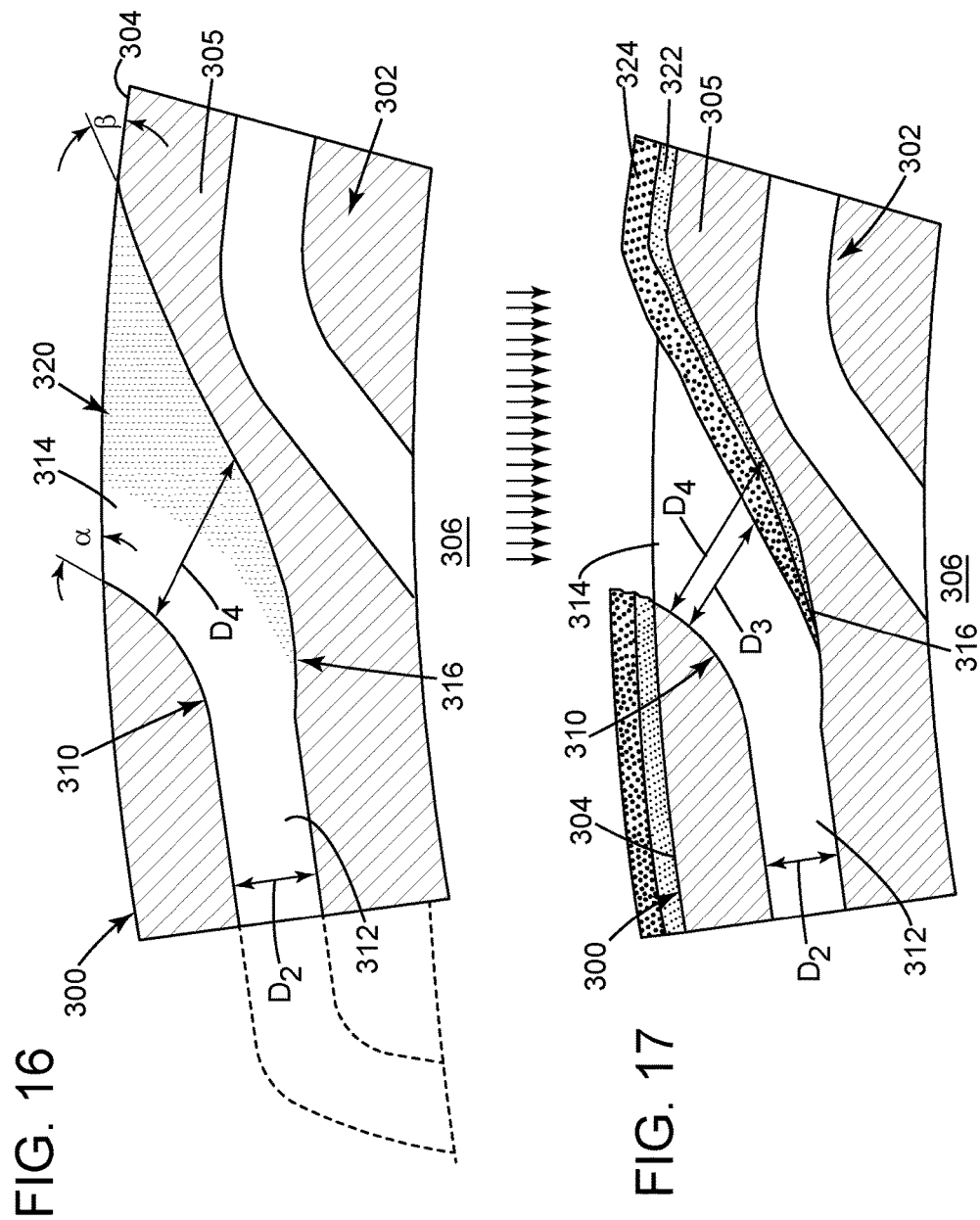

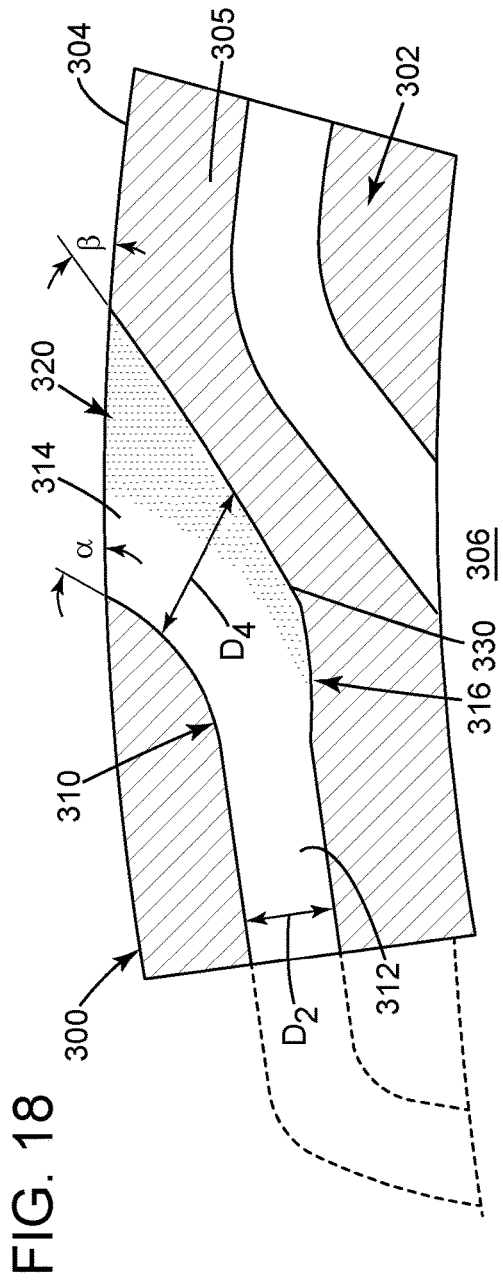
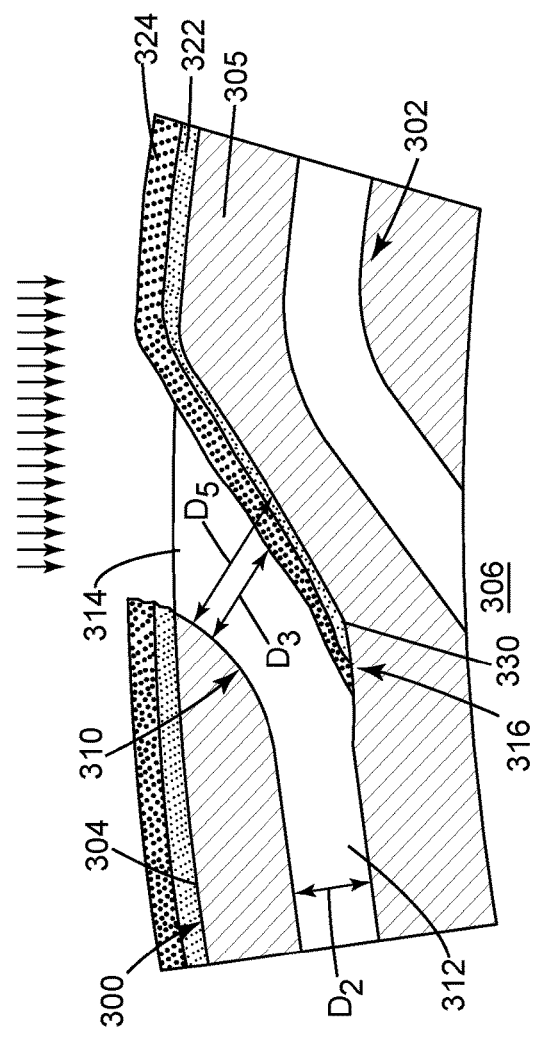
FIG. 18
FIG. 19

COUPON FOR HOT GAS PATH COMPONENT HAVING MANUFACTURING ASSIST FEATURES

CROSS-REFERENCE TO RELATED APPLICATIONS

This application relates to co-pending U.S. patent application Ser. No. 15/205,167, filed concurrently,

BACKGROUND OF THE INVENTION

The disclosure relates generally to hot gas path components, and more particularly, to a coupon for replacing a cutout of a hot gas path component. In one embodiment, the coupon includes a number of manufacturing assist features for improved coupling and finishing of the coupon. In another embodiment, the coupon includes cooling openings configured to not be blocked by a coating applied to an outer surface of the coupon.

Hot gas path components are used in turbomachines to direct a working fluid in a manner to create energy. Hot gas path components can take a variety of forms such as turbomachine blades (rotor blades or stationary vanes) that include airfoils that direct a working fluid to create energy. Rotor blades are coupled to and act to turn a turbine rotor, and stationary vanes are coupled to a casing of the turbomachine to direct the working fluid towards the rotor blades.

Some of the most advanced hot gas path components include near wall cooling configurations to cool outer walls of the components. However, near wall cooling configurations present a significant challenge for manufacturing. In recent years, additive manufacturing, such as direct metal laser melting (DMLM) or selective laser melting (SLM), has emerged as a reliable manufacturing method for such ultra-efficient near wall cooling arrangements. The advent of additive manufacturing techniques has also provided the ability to replace sections of hot gas path components such as a leading or trailing edge of a turbomachine blade. For example, a portion of a leading edge of a turbomachine blade may be removed, leaving a cutout in the blade, and a new section (referred to herein as a "coupon") may be coupled in the cutout. The coupon can replace a worn section of a used turbomachine blade, or be added as part of a new turbomachine blade. The coupon can simply replace internal cooling structures of the turbomachine blade, or may provide additional or improved cooling structures, e.g., near wall cooling passages, internal cooling passages, impingement sleeves, pin banks, etc., that were not provided in the original turbomachine blade.

Despite the growth of additive manufacturing to create the coupons, the use of coupons to replace sections of hot gas path components presents a number of manufacturing challenges.

In order to unlock the potential of this method for the targeted replacement of larger segments of the component, an exact match of the coupon and the precision machined cutout is needed for achieving reliable joining quality. The gap for joining (gap between coupon and cutout in the component) depends on the precision of the contouring of the coupon and the original component. Any mismatch will result in a variation of the gap distance. Tight gap tolerances with gap widths below 100 µm are required if a narrow gap brazing process is chosen. In order to obtain these tight tolerances and to ensure an optimum fit between both parts, the same machining path is used for the wire electrical discharge machining (EDM) cutting of coupon and original component. In one approach, a wire EDM control program is prepared and used first for the precision machining of the coupon. Thereafter, the same control program is used a second time for the machining of a matching cutout in the hot gas path component. During this second step only the width of the cutting tool (i.e., the EDM wire thickness) is compensated, so that a near 'zero gap' fit is obtained between the additive manufactured coupon and the original component. Despite this approach, gaps can still exist between the coupon and the cutout in the original component.

Another challenge for use of coupon replacements is providing precise manual re-contouring after coupon joining. In particular, during the re-contouring of components with cooling channels close to the hot gas surface, minimum wall thickness requirements may be violated and the near wall cooling scheme may be damaged. This is particularly cumbersome as wall thickness tolerances are tight and as there is no direct feedback about the remaining wall thickness for the grinding operator during the grinding process. A minimal wall thickness (e.g., 1.2 millimeter) between a hot gas side and a near wall cooling passage may be required to achieve mechanical integrity and lifetime assessments.

After the joining and re-contouring steps for a coupon are implemented, one or more protective coatings (e.g., a bond coating and a thermal barrier coating) are applied. One obstacle presented by the coating(s) is the unavoidable clogging of the existing cooling passages by coating overspray. Conventionally, after coating(s) application, a reopening step is required for the blocked cooling passages in order to meet the airflow requirements of the hot gas path component. Due to the cooling passage arrangement, this reopening of the near wall cooling passage exit holes must be completed very carefully in order to avoid any risk of clogging of the exit holes. In particular, sharp bending angles in the opening may cause reamer tools to break, creating additional clogging. Consequently, the process is time-consuming and expensive.

BRIEF DESCRIPTION OF THE INVENTION

A first aspect of the disclosure provides a coupon for replacing a cutout in a hot gas path component of a turbomachine, the coupon comprising: a body having an outer surface; and a plurality of grinding depth indicators in the outer surface of the body.

A second aspect of the disclosure provides a coupon for replacing a cutout in a hot gas path component of a turbomachine, the coupon comprising: a body having an edge periphery configured to mate with an edge periphery of the cutout, wherein at least a portion of the edge periphery of the body has a wall thickness greater than a wall thickness of an edge periphery of the cutout.

A third aspect of the disclosure provides a non-transitory computer readable storage medium storing code representative of a coupon for replacing a cutout in a hot gas path component of a turbomachine, the coupon physically generated upon execution of the code by a computerized additive manufacturing system, the code comprising: code representing the coupon, the coupon including: a body having an outer surface; and a plurality of grinding depth indicators in the outer surface of the body.

A fourth aspect of the disclosure provides a coupon for replacing a cutout in a hot gas path component of a turbomachine, the coupon comprising: a body having an outer surface; a chamber within the body for receiving a flow of a coolant; and a passage extending from the chamber to the outer surface of the body, wherein the passage includes an internal portion within a wall of the body having a first perpendicular, cross-sectional area and an exit portion at the outer surface of the body having a second perpendicular, cross-sectional area that is greater than the first perpendicular, cross-sectional area.

A fifth aspect of the disclosure provides a hot gas path component of a turbomachine, the component comprising: a body having an outer surface; a chamber within the body for receiving a flow of a coolant; and a passage extending from the chamber to the outer surface of the body, wherein the passage includes an internal portion within a wall of the body having a first perpendicular, cross-sectional area and an exit portion at the outer surface of the body having a second perpendicular, cross-sectional area that is greater than the first perpendicular, cross-sectional area.

A sixth aspect of the disclosure provides a non-transitory computer readable storage medium storing code representative of a coupon for replacing a cutout in a hot gas path component of a turbomachine, the coupon physically generated upon execution of the code by a computerized additive manufacturing system, the code comprising: code representing the coupon, the coupon including: a body having an outer surface; a chamber within the body for receiving a flow of a coolant; and a passage extending from the chamber to the outer surface of the body, wherein the passage includes an internal portion within a wall of the body having a first perpendicular, cross-sectional area and an exit portion at the outer surface of the body having a second perpendicular, cross-sectional area that is greater than the first perpendicular, cross-sectional area.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 16 shows a partial cross-sectional view of a coupon including a near wall cooling passage according to embodiments of the disclosure.

FIG. 17 shows a partial cross-sectional view of the coupon of FIG. 16 including a near wall cooling passage according to embodiments of the disclosure with at least one coating applied thereto.

FIG. 18 shows a partial cross-sectional view of a coupon including a near wall cooling passage according to another embodiment of the disclosure.

FIG. 19 shows a partial cross-sectional view of the coupon of FIG. 18 including a near wall cooling passage according to embodiments of the disclosure with at least one coating applied thereto.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

Figure 1:
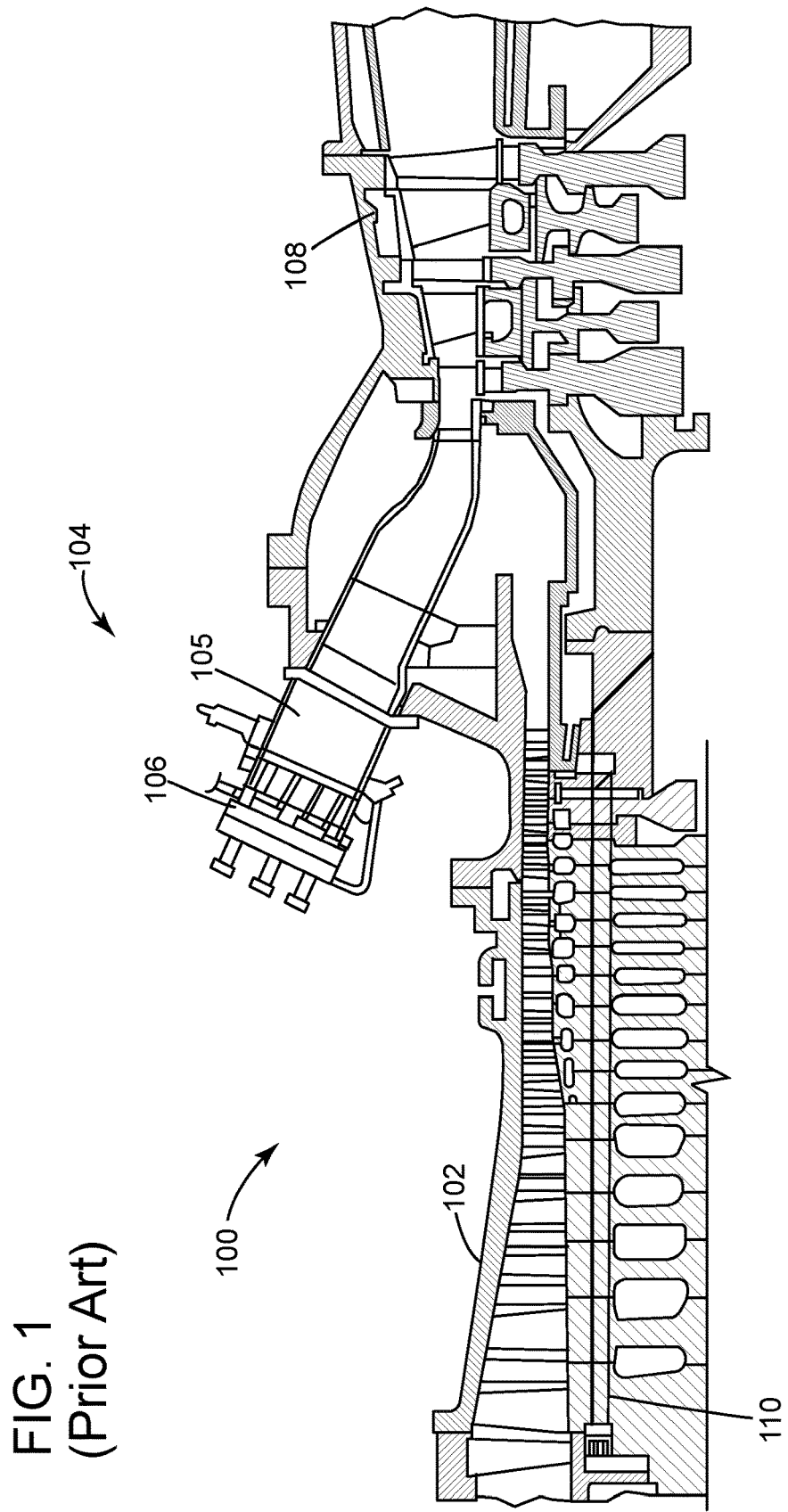
FIG. 1 shows a schematic view of an illustrative turbomachine in the form of a gas turbine system.

As an initial matter, in order to clearly describe the current disclosure it will become necessary to select certain terminology when referring to and describing relevant machine components within a gas turbine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft", without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The disclosure includes a modular manufacturing concept for the retrofit and upgrade of gas turbine hot gas path components using coupons. The concept relies on the replacement of larger segments of the hot gas path component with coupons (inserts), which may contain performance increasing features, e.g., more efficient cooling designs. The disclosure provides a coupon that does not only enable higher performance but also provides manufacturing assist features that help to achieve high quality manufacturing at lower costs.

FIG. 1 shows a schematic illustration of an illustrative turbomachine 100 in the form of a combustion or gas turbine system. Turbomachine 100 includes a compressor 102 and a combustor 104. Combustor 104 includes a combustion region 105 and a fuel nozzle assembly 106. Turbomachine 100 also includes a turbine assembly 108 and a common compressor/turbine shaft 110 (sometimes referred to as rotor 110). In one embodiment, the combustion turbine system is a MS7001FB engine, sometimes referred to as a 7FB engine, commercially available from General Electric Company, Greenville, S.C. The present disclosure is not limited to any one particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine assembly 108 for which gas stream thermal energy is converted to mechanical rotational energy. Turbine assembly 108 is rotatably coupled to and drives rotor 110. Compressor 102 also is rotatably coupled to rotor 110. In the illustrative embodiment, there is a plurality of combustors 104 and fuel nozzle assemblies 106.

Figure 2:
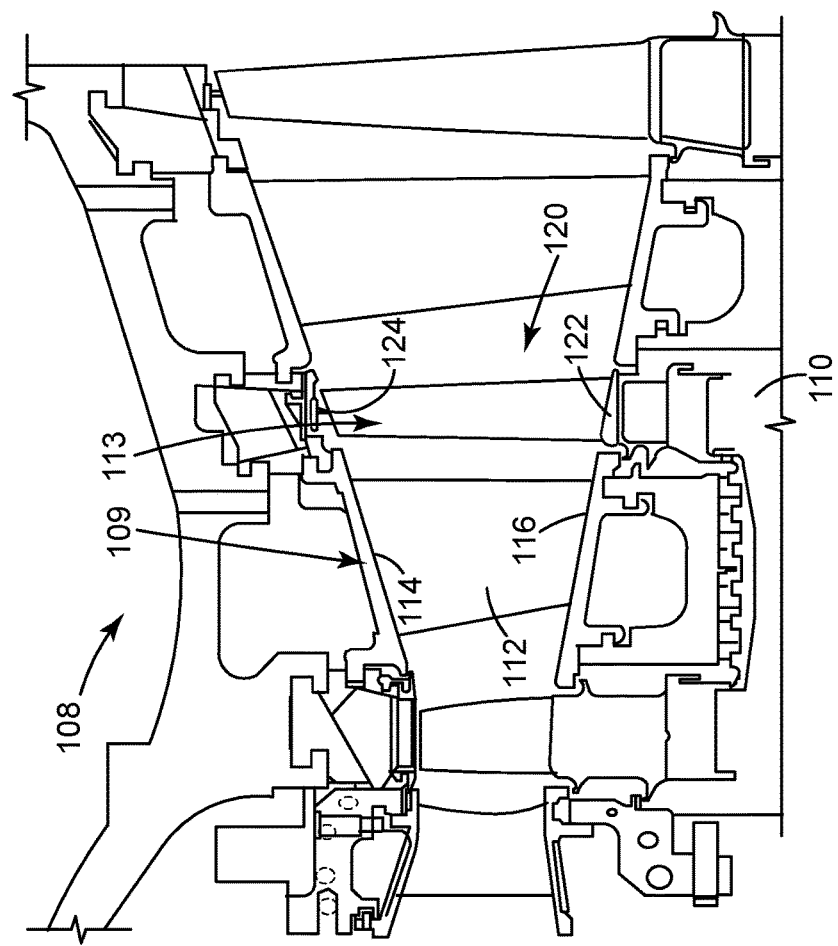
FIG. 2 shows a cross-sectional view of an illustrative gas turbine assembly that may be used with the gas turbine system in FIG. 1.

FIG. 2 shows a cross-sectional view of an illustrative turbine assembly 108 of turbomachine 100 (FIG. 1) that may be used with the gas turbine system in FIG. 1. Turbine assembly 108 includes a row of blades 109 coupled to a stationary casing of turbomachine 100 and axially adjacent another row of blades 113. Here, row of blades 109 includes stationary blades or vanes 112. A vane 112 may be held in turbine assembly 108 by a radially outer platform 114 and a radially inner platform 116. Row of blades 113 in turbine assembly 108 includes rotating blades 120 coupled to rotor 110 and rotating with the rotor. Rotating blades 120 may include a radially inward platform 122 (at root of blade) coupled to rotor 110 and a radially outward tip shroud 124 (at tip of blade). As used herein, the term "blade" or "hot gas path component" shall refer collectively to stationary vanes or blades 112 and rotating blades 120, unless otherwise stated.

Figure 3:
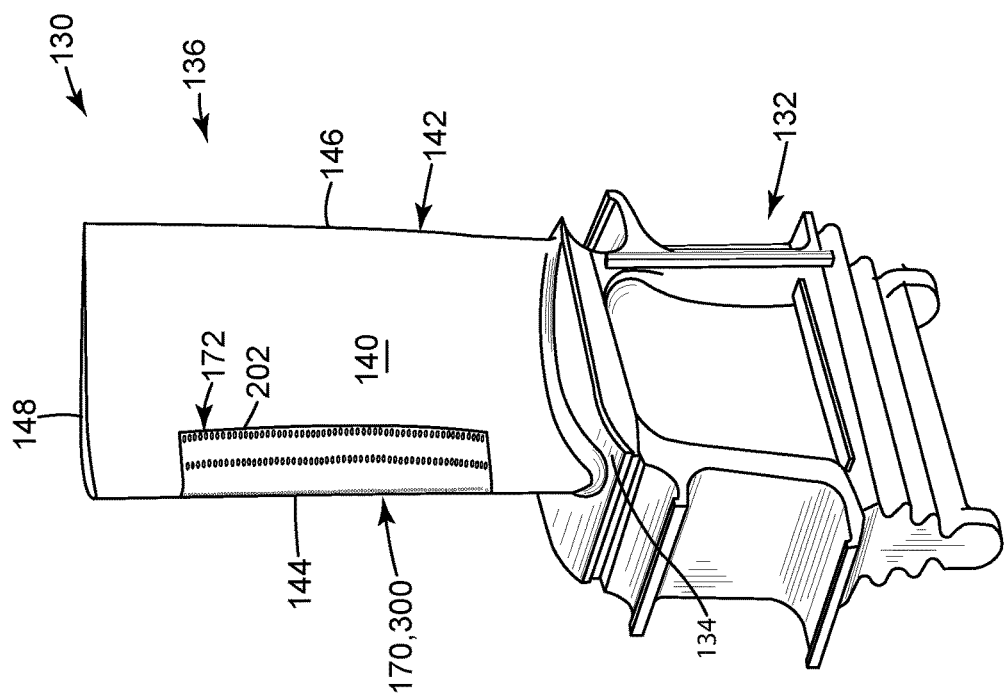
FIG. 3 shows a perspective view of a turbine rotor blade of the type in which embodiments of the present disclosure may be employed.
Figure 4:
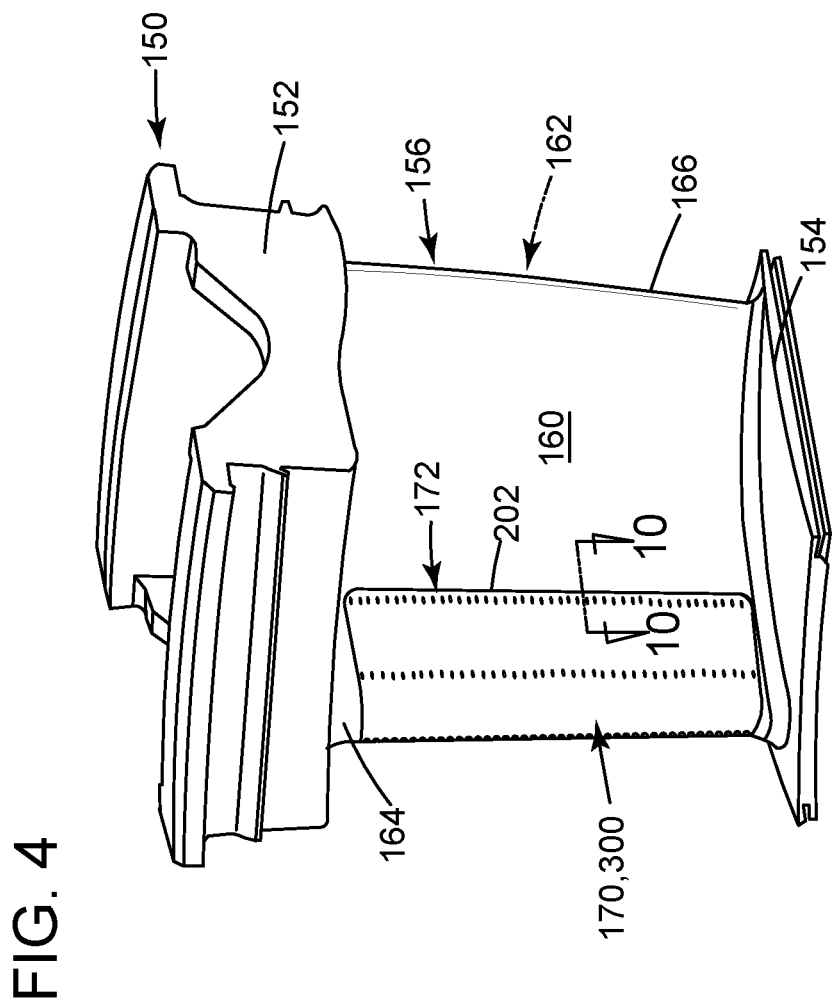
FIG. 4 shows a perspective view of a turbine vane of the type in which embodiments of the present disclosure may be employed.

FIGS. 3 and 4 show illustrative hot gas path components of a turbomachine in which a coupon replaces a cutout in the hot gas path component. FIG. 3 shows a perspective view of a turbine rotor blade 130 of the type in which embodiments of the present disclosure may be employed. Turbine rotor blade 130 includes a root 132 by which rotor blade 130 attaches to rotor 110 (FIG. 2). Root 132 may include a dovetail configured for mounting in a corresponding dovetail slot in the perimeter of the rotor disc. Root 132 may further include a shank that extends between the dovetail and a platform 134, which is disposed at the junction of airfoil 136 and root 132 and defines a portion of the inboard boundary of the flow path through turbine 100. It will be appreciated that airfoil 136 is the active component of rotor blade 130 that intercepts the flow of working fluid and induces the rotor disc to rotate. While the blade of this example is a turbine rotor blade 130, it will be appreciated that the present disclosure also may be applied to other types of blades within turbine engine 100, including turbine stationary blades 112 (FIG. 2) (vanes). It will be seen that airfoil 136 of rotor blade 130 includes a concave pressure side (PS) outer wall 140 and a circumferentially or laterally opposite convex suction side (SS) outer wall 142 extending axially between opposite leading and trailing edges 144, 146 respectively. Sidewalls 140 and 142 also extend in the radial direction from platform 134 to an outboard tip 148.

FIG. 4 shows a perspective view of a vane 150 of the type in which embodiments of the present disclosure may be employed. Stationary vane 150 includes an outer platform 152 by which stationary vane 150 attaches to a casing of the turbomachine. Outer platform 152 may include any now known or later developed mounting configuration for mounting in a corresponding mount in the casing. Stationary vane 150 may further include an inner platform 154 for positioning between adjacent turbine rotor blades 130 (FIG. 3) platforms 134 (FIG. 3). Platforms 152, 154 define respective portions of the outboard and inboard boundary of the flow path through turbine 100. It will be appreciated that airfoil 156 is the active component of stationary vane 150 that intercepts the flow of working fluid and directs it towards turbine rotor blades 130 (FIG. 3). It will be seen that airfoil 156 of stationary vane 150 includes a concave pressure side (PS) outer wall 160 and a circumferentially or laterally opposite convex suction side (SS) outer wall 162 extending axially between opposite leading and trailing edges 164, 166 respectively. Sidewalls 160 and 162 also extend in the radial direction from platform 154 to platform 152.

Turbine rotor blade 130 (FIG. 3) and stationary vane 150 (FIG. 4) as examples of a hot gas path component also both include a coupon 170, 300 according to embodiments of the disclosure positioned in a cutout 172 in a leading edge 144, 164, respectively, thereof. Embodiments of coupon 170, 300 according to the disclosure and described herein will include aspects applicable to either turbine rotor blade 130 or vane 150. It is understood that other features of coupon 170, 300, not described herein such as but not limited to internal cooling structures, cutout shape, outer wall angling/shape, etc., may be customized for the particular application, i.e., rotor blade or vane.

As shown in FIGS. 3 and 4, coupon 170, 300 is very tightly positioned within cutout 172. In order to obtain these tight tolerances and to ensure an optimum fit between the coupon and the blade, the same machining path may be used for forming a coupon and cutout, e.g., using wire electrical discharge machining (EDM) cutting of the coupon and the hot gas path component. As noted herein, in one approach, a wire EDM control program is prepared and used first for the precision machining of the coupon. Thereafter, the same control program is used a second time for the machining of a matching cutout in the hot gas path component. During this second step only the width of the cutting tool (i.e., the EDM wire thickness) is compensated, so that a near 'zero gap' fit is obtained between the additive manufactured coupon and the original component. As noted, however, gaps can still exist between the coupon and the cutout.

Figure 5:
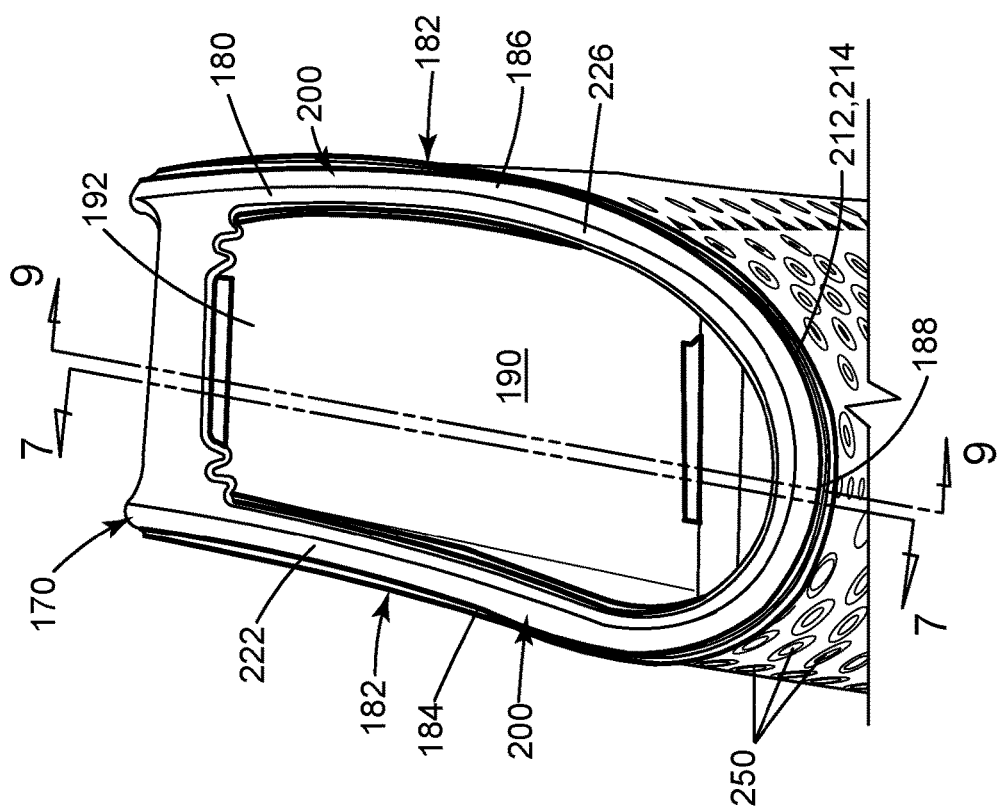
FIG. 5 shows an upper perspective view of a coupon according to embodiments of the disclosure.
Figure 7:
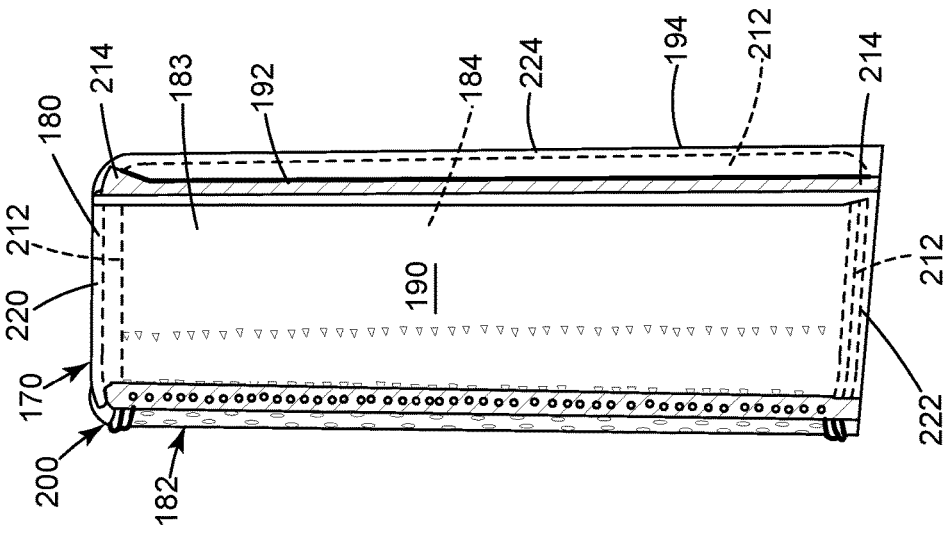
FIG. 7 shows a cross-sectional view of the coupon of FIG. 5 along line 7-7 in FIG. 5 from a convex suction side of the coupon.
Figure 6:
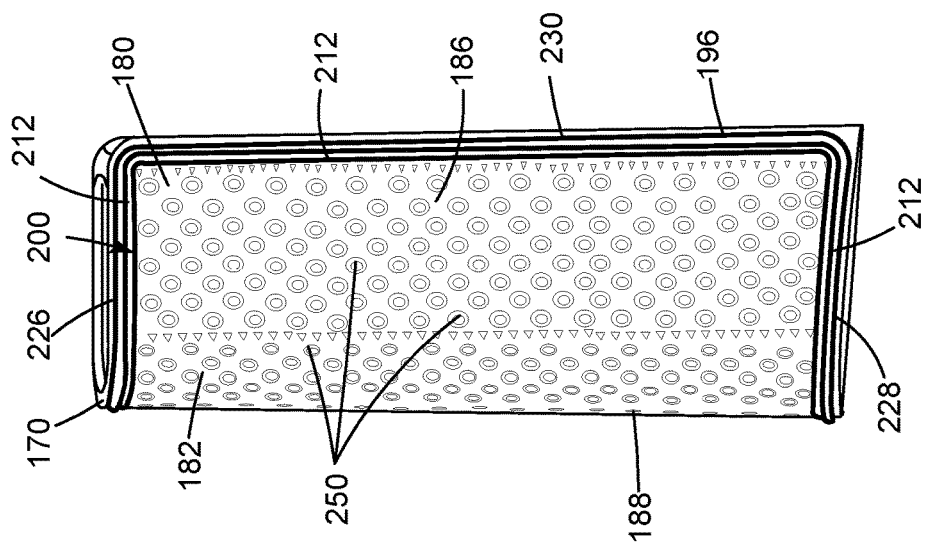
FIG. 6 shows a side view of the coupon of FIG. 5 from a convex suction side of the coupon.
Figure 9:
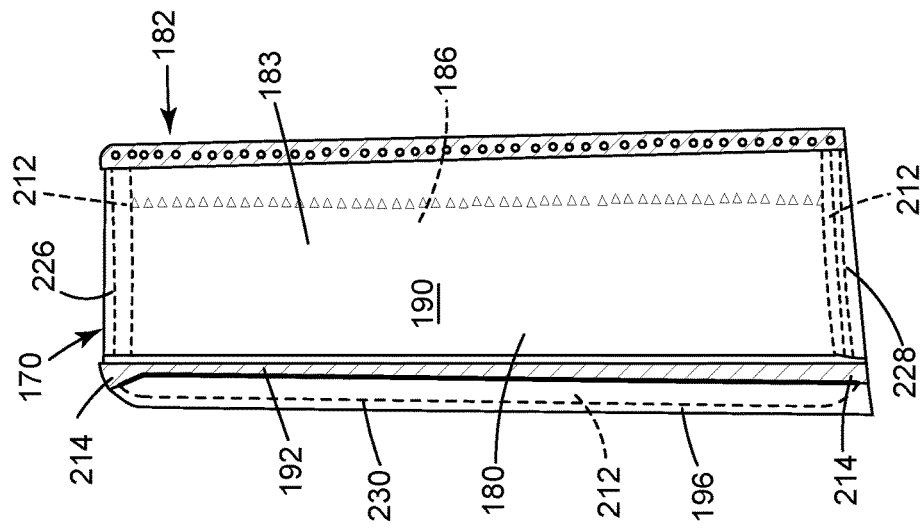
FIG. 9 shows a cross-sectional view of the coupon of FIG. 5 along line 9-9 in FIG. 5 from the concave pressure side of coupon.
Figure 8:
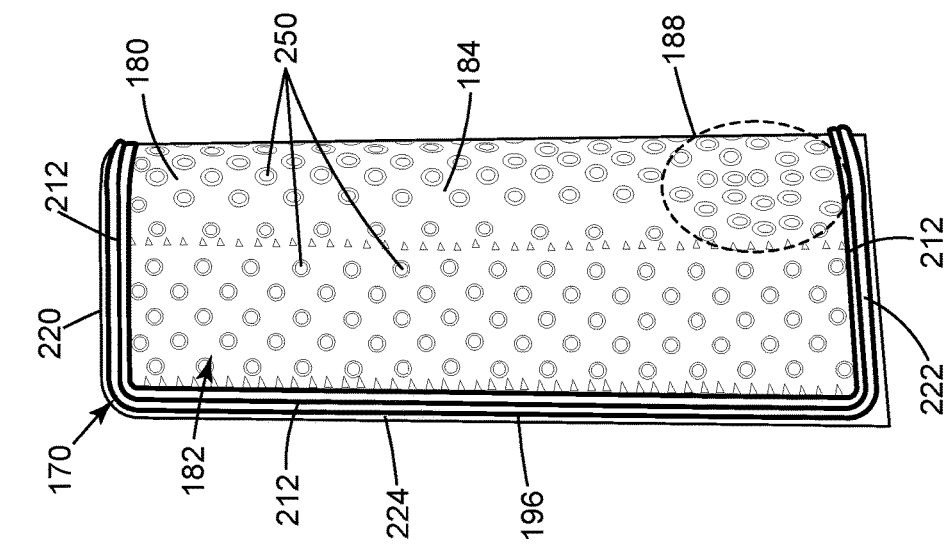
FIG. 8 shows a side view of the coupon of FIG. 5 from a concave pressure side of the coupon.

Referring to FIGS. 5-9, a coupon 170 according to embodiments of the disclosure are illustrated in more detail. FIG. 5 shows an upper perspective view of coupon 170; FIG. 6 shows a side view and FIG. 7 shows a cross-sectional view (along line 7-7 in FIG. 5) from a convex suction side of coupon 170; and FIG. 8 shows a side view and FIG. 9 shows a cross-sectional view (along line 9-9 in FIG. 5) from a concave pressure side of coupon 170. Coupon 170 may include a body 180. As illustrated, body 180 may have an outer surface 182. Body 180 may be defined by a concave pressure side outer wall 184 and a convex suction side outer wall 186 coupled along, as shown best in FIG. 5, a radially extending edge 188 of each (edge 188 is a leading edge in a leading edge coupon as illustrated). Outer walls 184, 186 define therebetween a radially extending chamber 190. A connecting wall 192 (FIG. 5) may extend between respective trailing edges 194, 196 (FIGS. 6-9) of concave pressure side outer wall 184 and convex suction side outer wall 186 to close off a trailing end of coupon 170. Although not shown for clarity, it is understood that radially extending chamber 190 (FIGS. 5, 7, and 9) may include any of a large variety of cooling structures segregating the chamber, such as but not limited to: ribs, impingement sleeves, and pin banks.

Figure 10:
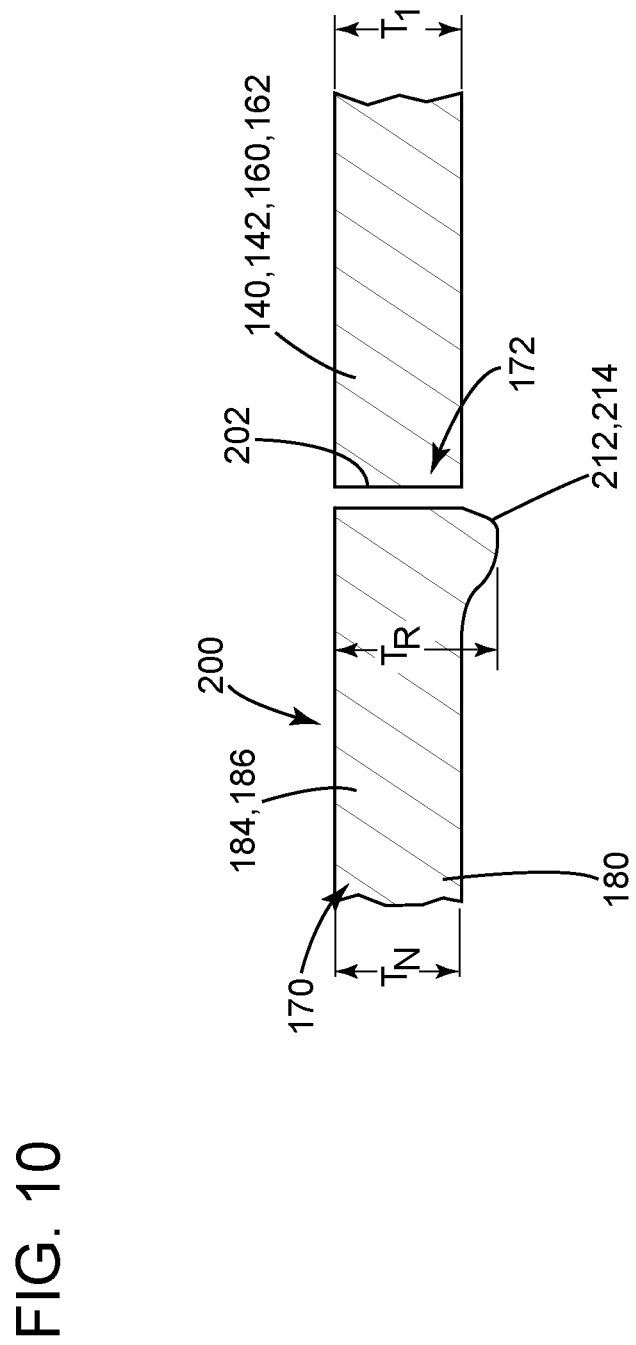
FIG. 10 shows an enlarged cross-sectional view along line 10-10 in FIG. 4 of a portion of the coupon mounted in a cutout.

Coupon 170 may be coupled into cutout 172 (FIGS. 3 and 4) using a high temperature brazing technique with a highly accurate geometrical fit of coupon 170 and cutout 172 in the hot gas path component. In order to obtain an optimum fit between coupon 170 and cutout 172 and to ensure sufficient braze area, in accordance with embodiments of the disclosure, coupon 170 is thickened in the immediate vicinity of the braze joint. To further explain, as shown in FIGS. 5-9, and best shown in the enlarged cross-sectional view of FIG. 10, body 180 also includes an edge periphery 200 (FIG. 5) configured to mate with an edge periphery 202 (FIGS. 3 and 4) of cutout 172. In accordance with embodiments of the disclosure, at least a portion 210 (shaded in FIGS. 5-9) of edge periphery 200 of body 180 has a wall thickness $T_R$ (FIG. 10) greater than a wall thickness $T_1$ (FIG. 10) of edge periphery 202 of cutout 172. Further, the least a portion 210 of edge periphery 200 of body 180 may also have a wall thickness $T_R$ (FIG. 10) greater than a wall thickness $T_N$ (FIG. 10) of the rest of coupon 170, i.e., of remainder of body 180 (when finished) ($T_R > T_N$). As shown best in FIG. 10, the at least the portion 210 of edge periphery 200 of body 180 having the greater wall thickness may be defined by: a tapered rib 212 (shaded in FIG. 5-9). Tapered rib 212 may have a peripherally outer thickness $T_R$ (FIG. 10) greater than wall thickness $T_1$ of edge periphery 202 of cutout 172 and a peripherally internal thickness $T_N$ of body 180. Internal wall thickness $T_N$ can be more or less thick than wall thickness $T_1$ of edge periphery 202 of cutout 172. Tapered rib 212 provides slightly thicker walls at a periphery of coupon 170 compared to the nominal wall thickness $T_N$ of the hot gas path component, which ensures a sufficiently large cross section of the brazing joint between coupon 170 and cutout 172 to provide an optimal fit for braze joining, e.g., a gap smaller than 50 µm. Tapered rib 212 may extend inwards from outer periphery 200 and it may then gradually reduce to the nominal wall thickness of coupon 170 (FIG. 10).

Figure 11:
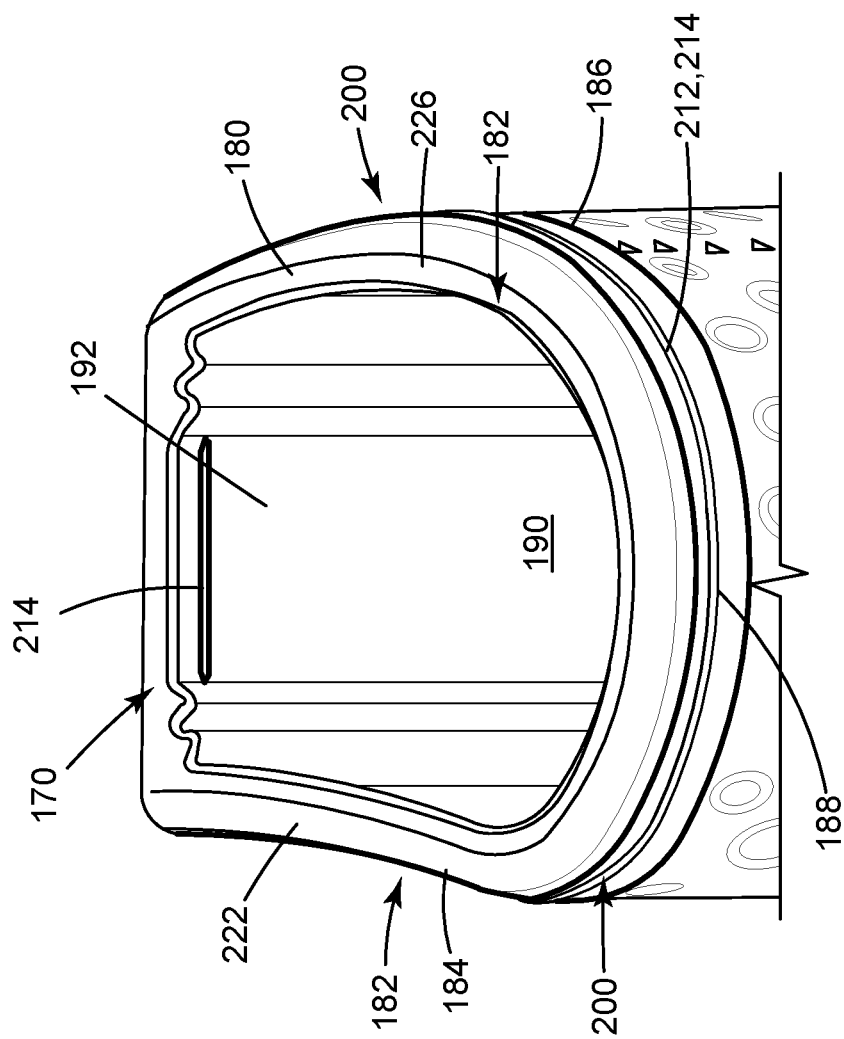
FIG. 11 shows another upper perspective view of a coupon according to embodiments of the disclosure.

As noted, body 180 is defined by concave pressure side outer wall 184 and convex suction side outer wall 186 that connect along a first radially extending edge 188 of each. Edge periphery 200 of body 180 may be defined by edges of concave pressure side and convex suction side outer walls 184, 186. To this end, concave pressure side wall 184 includes a first end edge 220 (FIGS. 7-8) and a second end edge 222 (FIGS. 5 and 7-8) separated by a second radially extending edge 224, and convex suction side outer wall 186 includes a third end edge 226 and a fourth end edge 228 separated by a third radially extending edge 230. FIG. 11 shows another perspective view of a coupon 170. Tapered rib 212 is contiguous along first end edge 220, second end edge 222, second radially extending edge 224, third end edge 226, fourth edge 228 and third radially extending edge 230. It is emphasized, however, that tapered rib 212 may extend only along selected edges, where additional brazing material is warranted. As shown in FIGS. 7, 9 and 11, at least a portion of a tapered rib 214 may also extend along an edge (upper and/or lower) of connecting wall 192. As illustrated, tapered rib 214 may extend inwards from an edge and it may then gradually reduce to the nominal wall thickness of coupon 170 (FIGS. 7 and 9).

Tapered rib 212, 214 may have any thickness and may extend any distance from a respective edge required to provide adequate material and wetting surface for brazing. In one embodiment, tapered rib 212, 214 may have an additional thickness of, e.g., approximately 0.5 millimeters (mm). Tapered rib 212, 214 may have a length of 1 to 5 mm measured from periphery toward leading edge 188. The tapering provides a gradual transition that avoids excessive sharp steps on the outer and inner side of coupon 170, which is commensurate with conventional additive manufacturing practices that aim to keep coupon dimensions as small as possible to avoid any extra material volume that has to be generated from the powder bed.

Figure 12:
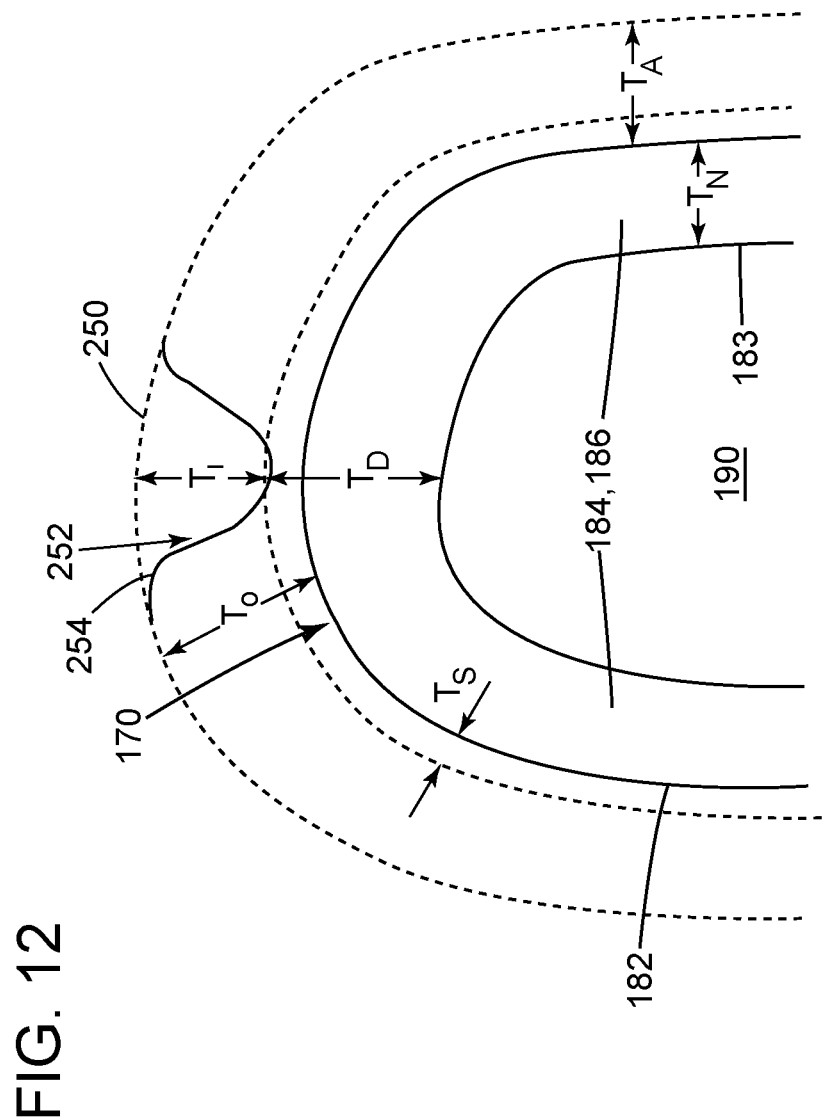
FIG. 12 shows a schematic cross-sectional view of a coupon including a grinding depth indicator according to embodiments of the disclosure.
Figure 13:
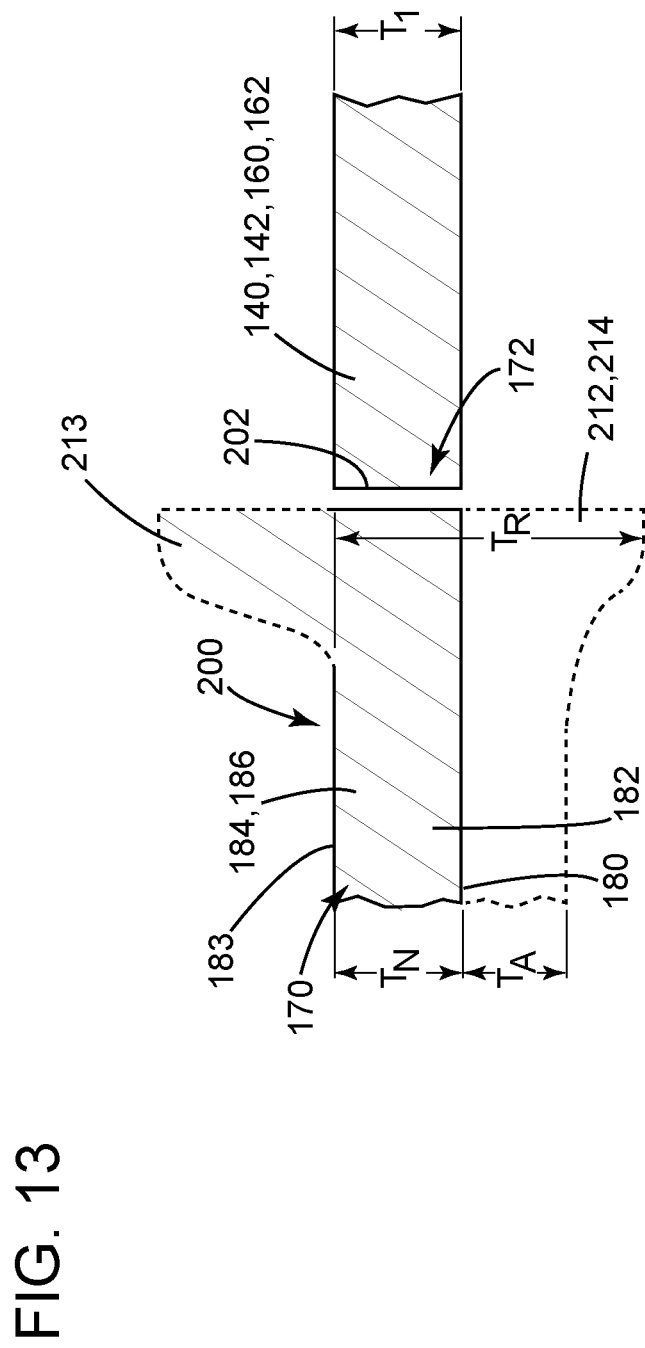
FIG. 13 shows an enlarged cross-sectional view along line 10-10 in FIG. 4 of a portion of the coupon mounted in a cutout according to another embodiment of the disclosure.

In accordance with another embodiment of the disclosure, as shown in the schematic cross-sectional view of FIG. 12 and the enlarged cross-sectional view of FIG. 13, coupon 170 may include walls 184, 186 that may be slightly thicker compared to the nominal wall thickness $T_N$ (eventual operative thickness) of the hot gas path component. As an example an additional wall thickness $T_A$ of, for example, 0.2 mm, can be added to outer surface 182 of coupon 170, compared to a conventional coupon. The additional 0.2 mm thickness $T_A$ provides enough material for a manual re-contouring step after coupon 170 brazing and to ensure a required wall thickness of the coupon after such a re-contouring. Tapered rib 212, 214 may be added on top of the additional 0.2 mm, i.e., 0.4 mm total additional thickness at the periphery. In another option, shown in FIG. 13, additional material 213, e.g., approximately 0.4 mm thick, can also be added to an inner surface 183 of coupon 170 where tapered rib 212, 214 exists to ensure sufficient braze area for joining even when there may be a minor misfit between coupon and cutout. This additional thickness is apart from tapered rib 212, 214.

Figure 14:
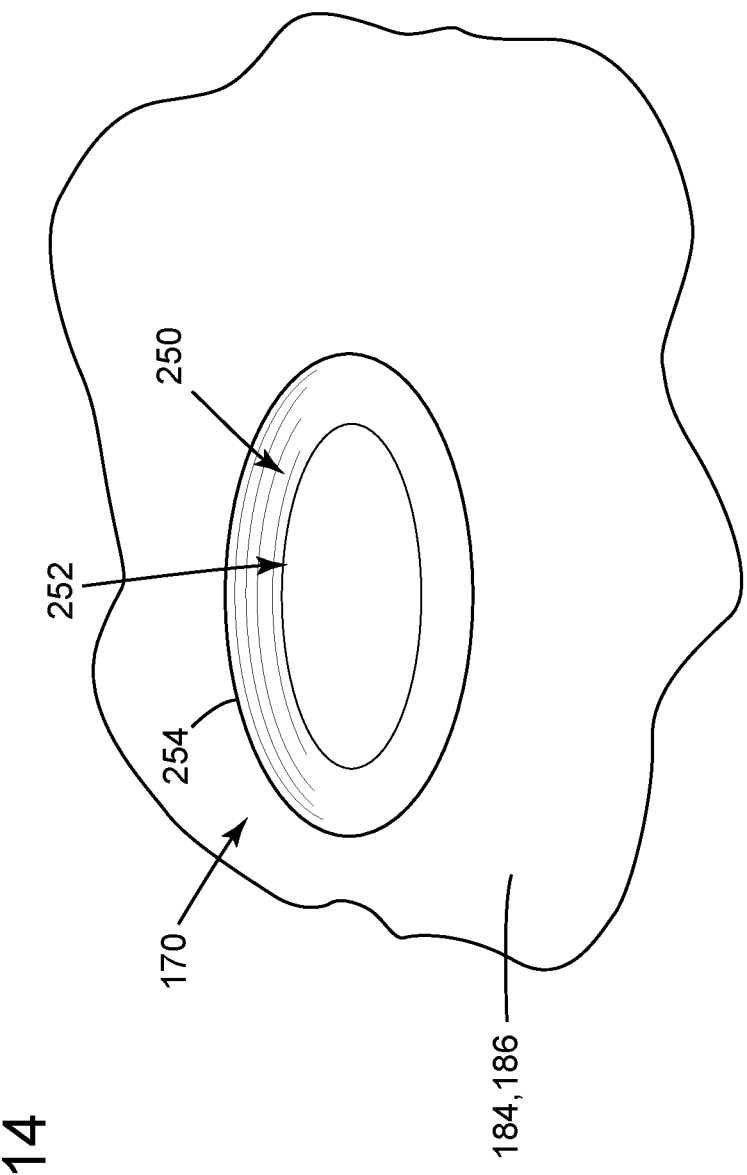
FIG. 14 shows a perspective view of a grinding depth indicator according to embodiments of the disclosure.

Despite the additional thickness $T_A$ added to outer surface 182, providing a precise manual re-contouring after coupon joining presents a challenge in maintaining minimum wall thickness requirements, especially for near wall cooling schemes. In order to address this issue and in contrast to conventional coupons, as shown best in FIGS. 5, 6, and 8, coupon 170 may also include a plurality of grinding depth indicators 250 in outer surface 182 of body 180. "Grinding depth indicators" may include any geometrical feature having a predefined and controlled depth in outer surface 182 of body 180. In one embodiment, as shown in FIG. 12, grinding depth indicators 250 each include a concavity 252 in outer surface 182 of body 180, i.e., as added to by additional thickness $T_A$. Although they can take practically any shape, in one example shown the perspective view of FIG. 14, each concavity may have a circular periphery 254, i.e., similar to conventional round dimples on a golf ball. In any event, as shown in FIG. 12, a thickness $T_D$ of a wall (e.g., 184, 186) of body 180 at a bottom of concavity 252 matches or nearly matches a pre-selected operational wall thickness for coupon 170. Depth indicators 250 may be uniformly distributed (e.g., left side of FIG. 8) over outer surface 182, or have certain clusters over outer surface 182 (e.g., see phantom oval in FIG. 8).

In operation, a grinder operator re-contours coupon 170, as depth indicators 250 become less deep and eventually disappear, they provide an indication on where to stop grinding, thus providing a homogeneous smoothening without excessive local grinding. As long as parts of depth indicators 250 are visible, the grinder can be sure that the wall thickness between hot gas side of the component and radially inner chamber 190 and/or integrated near wall cooling passages within outer walls 184, 186 are still above a nominal wall thickness. The use of additive manufacturing of coupon 170 allows the addition of depth indicators 250 at no extra costs. Referring to FIG. 12, in an example implementation, where the depth $T_1$ of depth indicators 250 is 150 micrometers (µm) and the oversize in thickness $T_O$ is 200 µm, there may be, for example, a 50 µm safety margin $T_S$ from the nominal wall thickness $T_N$ of coupon 170, when depth indicators 250 start to disappear. Small residual marks from the center of depth indicators 250 can be tolerated, as their relative area is very small in comparison to the smoothened area of outer surface 182. Therefore, there is a negligible risk of forming bonding defects during a subsequent coating step, e.g., of a bonding coating and a thermal barrier coating. After application of the coating(s), any remainder of depth indicators 250 are not visible on the new outer surface of coupon 170.

While grinding depth indicators 250 and tapered rib 212, 214 have been illustrated as used together, it is emphasized that coupon 170 may include only one of depth indicator 250 or tapered rib 212, 214 at a time.

Figure 15:
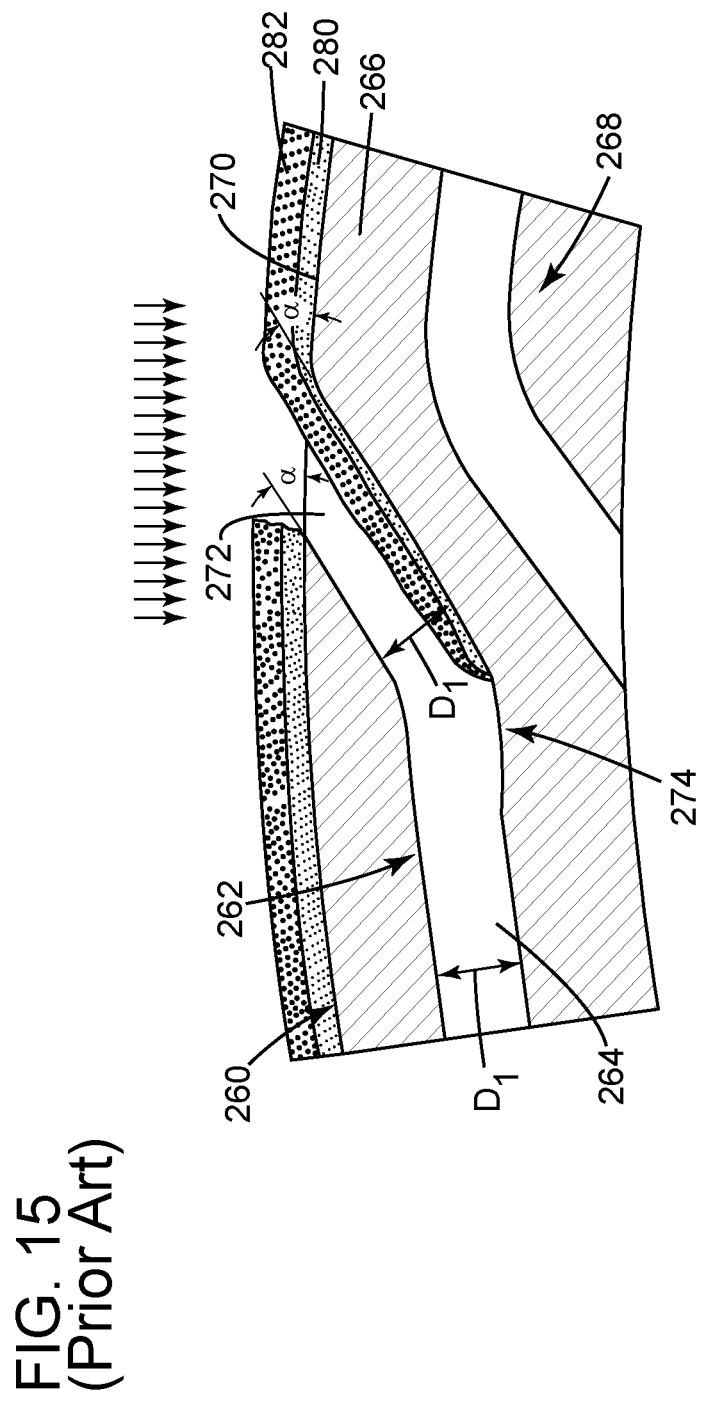
FIG. 15 shows a partial cross-sectional view of a conventional near wall cooling passage.

With further regard to coatings applied to a coupon after the joining and re-contouring steps are implemented, another embodiment of the disclosure addresses the unavoidable clogging of the existing cooling passages by coating overspray. FIG. 15 shows a partial cross-sectional view of a conventional coupon 260 having an illustrated near wall cooling passage 262. Cooling passage 262 may include an internal portion 264 that extends within wall 266 (outer walls) of a body 268 of coupon 260 in parallel or at an angle <15° with an outer surface 270 of body 268. An exit portion 272 meets outer surface 270 at a non-perpendicular angle relative to outer surface 270 after a bend 274 with internal portion 264. Passage 262 may have a uniform perpendicular, cross-sectional area throughout (indicated by diameter $D_1$ in portion 264, 272 for circular cross-sections); however, that is not necessary in all instances. As used herein "perpendicular, cross-sectional area" indicates an area defined by a cross-section taken orthogonally across an inner surface of the passage. As shown, due to the direction of spraying of coatings 280, 282 (arrows), coating(s) 280, 282 partially fill exit portion 272, after the coating(s) 260 are applied, thus necessitating a reopening step for the blocked cooling passages in order to meet the airflow requirements of the hot gas path component. This reopening of passage exit portion 272 is time-consuming and expensive, and may result in broken tools clogging the passage.

Referring to FIGS. 16-19, in another embodiment, a coupon 300 for replacing a cutout 172 (FIGS. 3 and 4) in a hot gas path component of a turbomachine is provided. FIGS. 16-17 show one embodiment and FIGS. 18-19 show another embodiment, which may be used separately or collectively. FIGS. 16-19 each show a partial cross-sectional view of coupon 300, FIGS. 16 and 18 prior to coating(s) application and FIGS. 17 and 19 thereafter. In these embodiments, coupon 300 may include a near wall cooling passage in which an exit portion at the outer surface of the body includes an enlarged volume compared to exit portion 272 (FIG. 15) formed by a layback angle and/or a nook in the exit portion to prevent clogging by coating(s) applied thereon. The enlarged volume recess provides a volume capable of receiving the coating(s) such that a perpendicular cross-section area of the passage remains sufficiently large to provide the desired cooling and prevent clogging by any tool breakage necessary to reopen the exit portion.

As shown in FIGS. 16-19, coupon 300 may include a body 302 having an outer surface 304. Body 302 may be substantially similar to body 180 (FIGS. 5-11) and may include any of the aforementioned embodiments. Body 302 may include an outer wall 305, similar to outer walls 184, 186 (FIGS. 5-11). A chamber 306 is positioned within body 302 for receiving a flow of a coolant. Chamber 306 may include any now known or later developed chamber, e.g., radially extending chamber 190 (FIG. 5) and/or segregated chambers thereof. A passage 310 extends from chamber 306 to outer surface 304 of body 302 to deliver coolant from within chamber 306 to cool wall 305, among other structure. Passage 310 can have any variety of cross-sectional shapes, e.g., circular, polygonal, etc. In any event, as shown in FIGS. 17 and 19, passage 310 includes an internal portion 312 within wall 305 of body 302 having a first perpendicular, cross-sectional area (denoted with reference $D_2$) and an exit portion 314 at outer surface 304 of body 302 having a second perpendicular, cross-sectional area (denoted with reference $D_3$) that is greater than the first perpendicular, cross-sectional area (at $D_2$). As will be described, second perpendicular, cross-sectional area (at $D_3$) is greater than first perpendicular, cross-sectional area (at $D_2$) even though at least one coating 322, 324 has been applied.

Exit portion 314 meets outer surface 304 at a non-perpendicular angle α relative to outer surface 304. Internal portion 312 may include at least a section that extends within wall 305 of body 302 at an angle less than 15° with outer surface 304 of body 302, and as understood opens to chamber 306 (see phantom lines in FIGS. 16 and 18) at an inward end and transitions to exit portion 314 at a bend 316. In one embodiment, internal portion 312 may include at least a section that extends within wall 305 of body 302 parallel (at 0°) with outer surface 304 of body 302. While a particular example of an internal portion 312 has been illustrated, it is emphasized that the internal portion can take a wide variety of alternative paths, e.g., non-straight with at least one bend along the coolant flow path. While second perpendicular, cross-sectional area is shown at a particular location ($D_3$) downstream from bend 316, it can be appreciated that a perpendicular, cross-sectional area at any location of downstream of bend 316 may be greater than first perpendicular, cross-sectional area (denoted with reference $D_2$), which can itself be at any location upstream of bend 316.

As illustrated in FIGS. 16-19, second perpendicular, cross-sectional area $D_3$ may be defined by an excess coating recess 320, the enlarged volume of which is shown by light shading in FIGS. 16 and 18, for retaining, as shown in FIGS. 17 and 19, at least one coating 322, 324 therein. In FIGS. 16 and 17, excess coating recess 320 may be created by 'laying back' the angle β at which an edge of exit portion 314 approaches outer surface 304 (β<α) creating an enlarged third perpendicular, cross-sectional area $D_4$ downstream of bend 316. Compare FIGS. 15 and 16. That is, third perpendicular cross-sectional area $D_4$ is defined at a location of second perpendicular, cross-sectional area $D_3$ but with the at least one coating 322, 324 therein and is greater than first perpendicular, cross-sectional area $D_2$. In FIGS. 18 and 19, excess coating recess 320 may be created by 'laying back' the angle β at which an edge of exit portion 314 approaches outer surface 304 (β<α) and further recessing passage 310 downstream of bend 316 (see additional nook or hollow 330), creating an enlarged fourth perpendicular, cross-sectional area $D_5$ downstream of bend 316. Compare FIGS. 17 and 19. That is, fourth perpendicular cross-sectional area $D_5$ is defined at a location of second perpendicular, cross-sectional area $D_3$ but with coating(s) 322, 324 therein and is greater than first perpendicular, cross-sectional area $D_2$. Fourth perpendicular cross-sectional area $D_5$ may also be greater than third perpendicular, cross-sectional area $D_4$ (FIG. 17).

Regardless of how provided, recess 320 provides an increased volume for coating(s) 322, 324 to be received in such a way that the volume of exit portion 314 is sufficiently large to provide the desired coolant flow even though part of it is filled with coating(s) 322, 324. Recess 320 acts as a reservoir for coating(s) 322, 324 overspray and reduces the bending of the machining tool, if a manual machining is chosen for overspray removal. Recess 320 also makes the reopening of exit portion 314 after the deposition of coating (s) 322, 324 much easier and faster, and also reduces the risk of broken tools. Recess 320 may also eliminate the need to provide any re-opening/reaming of passage 310 by manual machining. The size of recess 320, i.e., the size of layback angle β and/or nook 330, may be customized to ensure the desired coolant flow given passage 310 other dimensions and/or curvature, the coating(s) used and their anticipated thicknesses, etc. If necessary, other structures may be adjusted to accommodate exit portion 314, e.g., the angle of the other edge of exit portion 314 may be adjusted, spacing between adjacent internal portions 312 may be adjusted, etc.

Coating(s) 322, 324 are illustrated, in one example, as including a bond coating 322 and a thermal barrier coating (TBC) 324; however, the coating(s) can include any now known or later developed layers of material applied in the turbomachine setting. In another example, only a metallic bond/overlay coating is applied and no TBC is present.

While various embodiments and coupon 170, 300 have been described herein as separate variations, it is emphasized that any of the teachings of the disclosure can be used collectively or separately. Further, while coupons 170, 300 have been described and illustrated herein as leading edge coupons, the teachings of the disclosure are equally applicable to trailing edge coupons. Coupon 170, 300 may also include any other now known or later developed structure commensurate with its purpose, e.g., internal cooling structures, near wall cooling channels, etc. In one particular example, inside radially facing ends of cutout 172 can be angled with mating ends of coupon 170, 300 such that pressure applied to coupon 170, 300 from its concave pressure side outer wall forces the coupon into cutout 172, i.e., cutout seats the coupon therein.

Coupon 170, 300 (FIGS. 5-11 and 16-19, respectively) may be formed in a number of ways. In one embodiment, coupon 170, 300 may be made by casting. However, as noted herein, additive manufacturing is particularly suited for manufacturing coupon 170, 300. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM). In the current setting, DMLM or SLM have been found advantageous.

Figure 20:
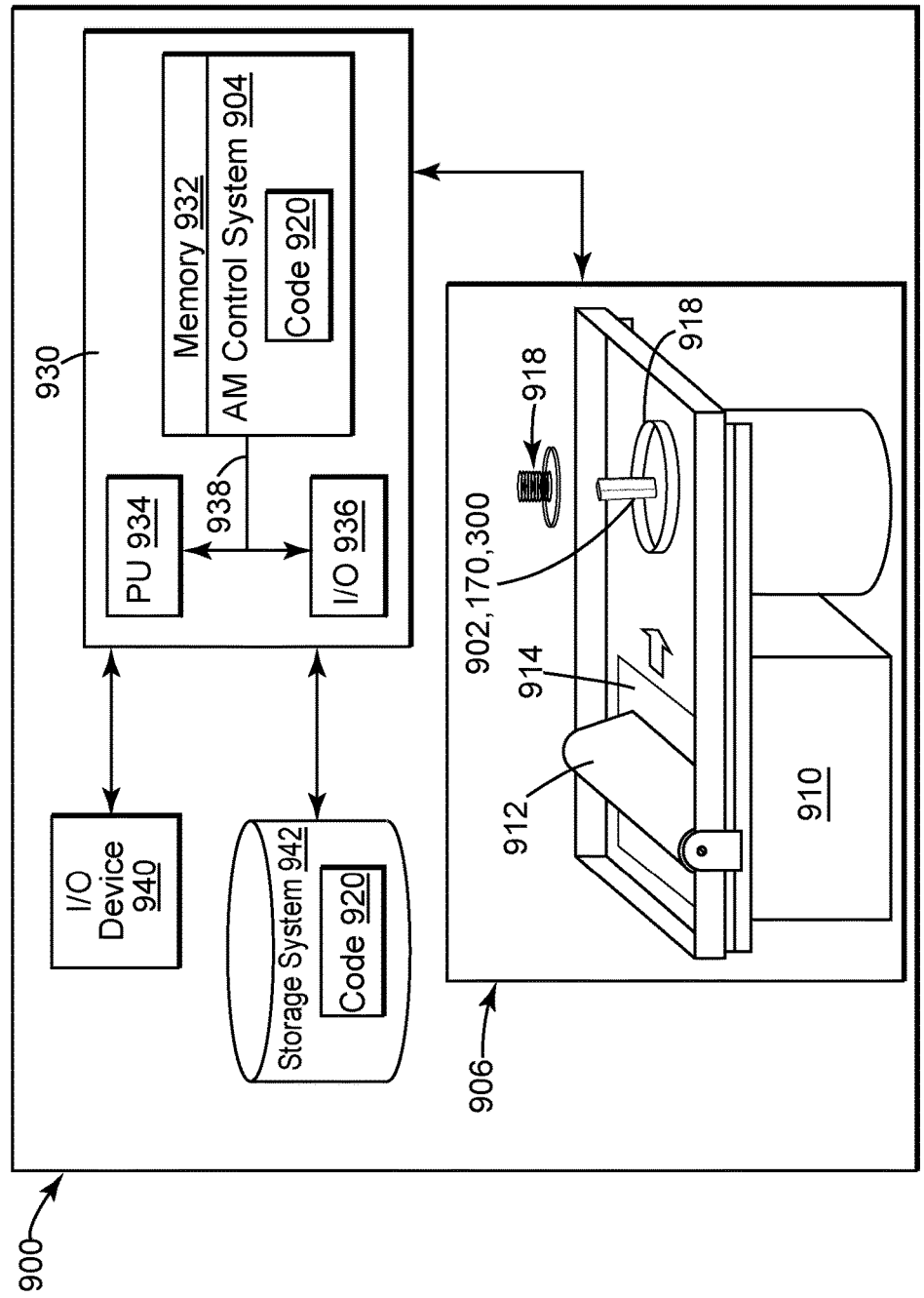
FIG. 20 shows a block diagram of an additive manufacturing process including a non-transitory computer readable storage medium storing code representative of a coupon according to embodiments of the disclosure.

To illustrate an example of an additive manufacturing process, FIG. 20 shows a schematic/block view of an illustrative computerized additive manufacturing system 900 for generating an object 902. In this example, system 900 is arranged for DMLM. It is understood that the general teachings of the disclosure are equally applicable to other forms of additive manufacturing. Object 902 is illustrated as a double walled turbine element; however, it is understood that the additive manufacturing process can be readily adapted to manufacture coupon 170, 300. AM system 900 generally includes a computerized additive manufacturing (AM) control system 904 and an AM printer 906. AM system 900, as will be described, executes code 920 that includes a set of computer-executable instructions defining coupon 170, 300 to physically generate the object using AM printer 906. Each AM process may use different raw materials in the form of, for example, fine-grain powder, liquid (e.g., polymers), sheet, etc., a stock of which may be held in a chamber 910 of AM printer 906. In the instant case, coupon 170, 300 may be made of a metal or metal compound capable of withstanding the environment of turbomachine 100 (FIG. 1). As illustrated, an applicator 912 may create a thin layer of raw material 914 spread out as the blank canvas from which each successive slice of the final object will be created. In other cases, applicator 912 may directly apply or print the next layer onto a previous layer as defined by code 920, e.g., where a metal binder jetting process is used. In the example shown, a laser or electron beam 916 fuses particles for each slice, as defined by code 920, but this may not be necessary where a quick setting liquid plastic/polymer is employed. Various parts of AM printer 906 may move to accommodate the addition of each new layer, e.g., a build platform 918 may lower and/or chamber 910 and/or applicator 912 may rise after each layer.

AM control system 904 is shown implemented on computer 930 as computer program code. To this extent, computer 930 is shown including a memory 932, a processor 934, an input/output (I/O) interface 936, and a bus 938. Further, computer 930 is shown in communication with an external I/O device/resource 940 and a storage system 942. In general, processor 934 executes computer program code, such as AM control system 904, that is stored in memory 932 and/or storage system 942 under instructions from code 920 representative of coupon 170, 300, described herein. While executing computer program code, processor 934 can read and/or write data to/from memory 932, storage system 942, I/O device 940 and/or AM printer 906. Bus 938 provides a communication link between each of the components in computer 930, and I/O device 940 can comprise any device that enables a user to interact with computer 940 (e.g., keyboard, pointing device, display, etc.). Computer 930 is only representative of various possible combinations of hardware and software. For example, processor 934 may comprise a single processing unit, or be distributed across one or more processing units in one or more locations, e.g., on a client and server. Similarly, memory 932 and/or storage system 942 may reside at one or more physical locations. Memory 932 and/or storage system 942 can comprise any combination of various types of non-transitory computer readable storage medium including magnetic media, optical media, random access memory (RAM), read only memory (ROM), etc. Computer 930 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 932, storage system 942, etc.) storing code 920 representative of coupon 170, 300. As noted, code 920 includes a set of computer-executable instructions defining outer electrode that can be used to physically generate the tip, upon execution of the code by system 900. For example, code 920 may include a precisely defined 3D model of outer electrode and can be generated from any of a large variety of well known computer aided design (CAD) software systems such as AutoCAD®, TurboCAD®, DesignCAD 3D Max, etc. In this regard, code 920 can take any now known or later developed file format. For example, code 920 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 920 may be translated between different formats, converted into a set of data signals and transmitted, received as a set of data signals and converted to code, stored, etc., as necessary. Code 920 may be an input to system 900 and may come from a part designer, an intellectual property (IP) provider, a design company, the operator or owner of system 900, or from other sources. In any event, AM control system 904 executes code 920, dividing coupon 170, 300 into a series of thin slices that it assembles using AM printer 906 in successive layers of liquid, powder, sheet or other material. In the DMLM example, each layer is melted to the exact geometry defined by code 920 and fused to the preceding layer. Subsequently, the coupon 170, 300 may be exposed to any variety of finishing processes, e.g., those described herein for re-contouring or other minor machining, sealing, polishing, etc.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A coupon for replacing a cutout in a hot gas path component of a turbomachine, the coupon comprising:
  a body defined by a concave pressure side outer wall and a convex suction side outer wall that connect along a first radially extending edge of each, the body having:
    an outer surface; and
    an edge periphery formed adjacent the outer surface and configured to mate with an edge of the cutout, the edge periphery of the body is defined by the concave pressure side outer wall further including a first end edge and a second end edge separated by a second radially extending edge, and the convex suction side outer wall including a third end edge and a fourth end edge separated by a third radially extending edge, and at least a portion of the edge periphery includes:
  a tapered rib extending adjacent the outer surface and contiguous along the first end edge, the second end edge, the second radially extending edge, the third end edge, the fourth edge and the third radially extending edge, the tapered rib having a peripherally outer thickness greater than a wall thickness of the remainder of the body; and
  a plurality of grinding depth indicators in the outer surface of the body.

2. The coupon of claim 1, wherein the plurality of grinding depth indicators each include a concavity in the outer surface of the body.

3. The coupon of claim 2, wherein each concavity has a circular periphery.

4. The coupon of claim 2, wherein a thickness of the wall of the body at a bottom of the concavity matches a pre-selected operational wall thickness for the coupon.

5. The coupon of claim 1, wherein the peripherally outer thickness of the tapered rib of the edge periphery of the body is greater than a wall thickness of the edge periphery of the cutout.

6. The coupon of claim 1, wherein the coupon is formed by additive manufacturing.

7. A coupon for replacing a cutout in a hot gas path component of a turbomachine, the coupon comprising:
  a body defined by a concave pressure side outer wall and a convex suction side outer wall that connect along a first radially extending edge of each, the body having:
    an outer surface; and
    an edge periphery formed adjacent the outer surface and configured to mate with an edge periphery of the cutout, the edge periphery of the body is defined by the concave pressure side outer wall further including a first end edge and a second end edge separated by a second radially extending edge, and the convex suction side outer wall including a third end edge and a fourth end edge separated by a third radially extending edge,
  wherein at least a portion of the edge periphery of the body includes a tapered rib extending adjacent the outer surface and contiguous along the first end edge, the second end edge, the second radially extending edge, the third end edge, the fourth edge and the third radially extending edge, the tapered rib having a peripherally outer thickness greater than a wall thickness of the remainder of the body.

8. The coupon of claim 7, wherein
the peripherally outer thickness of the tapered rib is greater than a wall thickness of the edge periphery of the cutout.

9. The coupon of claim 7, further comprising a plurality of grinding depth indicators in the outer surface of the body.

10. The coupon of claim 9, wherein the plurality of grinding depth indicators each include a concavity in the outer surface of the body.

11. The coupon of claim 10, wherein each concavity has a circular periphery.

12. The coupon of claim 10, wherein a thickness of a wall of the body at a bottom of the concavity matches a pre-selected operational wall thickness for the coupon.

13. A coupon for replacing a cutout in a hot gas path component of a turbomachine, the coupon comprising:
  a body having:
    an outer surface; and
    an edge periphery formed adjacent the outer surface and configured to mate with an edge of the cutout, the edge periphery of the body is defined by:
      a first end edge,
      a second end edge positioned radially opposite the first end edge,
      a first radially extending edge extending between first distal ends of the first end edge and the second end edge, respectively, and
      a second radially extending edge extending between second distal ends of the first end edge and the second end edge, respectively, opposite the first radially extending edge,
    wherein at least a portion of the edge periphery includes:
      a tapered rib extending adjacent the outer surface and contiguous along the first end edge, the second end edge, the second radially extending edge, the third end edge, the fourth edge and the third radially extending edge, the tapered rib having a peripherally outer thickness greater than a wall thickness of the remainder of the body.

* * * * *